United States Patent
Mackenzie

[11] 3,814,365
[45] June 4, 1974

[54] ADJUSTABLE MIRROR MOUNT
[75] Inventor: Donald Reeve Mackenzie, Plainfield, N.J.
[73] Assignee: Bell Telephone Laboratories Incorporated, Murray Hill, N.J.
[22] Filed: July 3, 1972
[21] Appl. No.: 268,724

[52] U.S. Cl. ............................... 248/278, 350/288
[51] Int. Cl. ...................... G02b 7/00, A47g 1/24
[58] Field of Search .......... 248/278, 284, 279, 280, 248/274, 276, 183; 350/288, 81, 321; 308/2 A

[56] References Cited
UNITED STATES PATENTS

| | | | |
|---|---|---|---|
| 2,611,659 | 9/1952 | Hadley | 308/2 A |
| 2,960,302 | 11/1960 | Brown | 248/358 R |
| 3,081,552 | 3/1963 | Reason | 308/2 A X |
| 3,140,614 | 7/1964 | Willis | 308/2 A |
| 3,204,471 | 9/1965 | Rempel | 74/89 |
| 3,252,696 | 5/1966 | Friedel | 308/2 A X |
| 3,277,555 | 10/1966 | Kutash | 308/2 A X |
| 3,407,018 | 10/1968 | Miller | 350/321 |

*Primary Examiner*—J. Franklin Foss
*Attorney, Agent, or Firm*—C. E. Graves

[57] ABSTRACT

An adjustable mount for rotatably orienting a structure, such as an optical element, about two orthogonal axes comprises first and second orthogonal cross spring pivots and respectively associated first and second coarse-fine adjustment mechanisms. Each cross spring pivot includes a first member and a second member which is rotatable relative to the first member, these two members being connected by first and second interleaved flat leaf springs which intersect along the respective axis of rotation. Application of a torque to the second member, which has the optical element mounted thereon, causes rotation thereof relative to the first member about the axis of rotation. Utilizing at least five interleaved spring portions provides substantially improved mechanical stability.

2 Claims, 5 Drawing Figures

ADJUSTABLE MIRROR MOUNT

FIELD OF THE INVENTION

This invention relates to a mount which allows for the precise angular adjustment of a structure, such as an optical element, about a predetermined axis and, in particular, to such a mount which includes at least one cross spring pivot.

BACKGROUND OF THE INVENTION

Proper operation of a laser system depends upon the precise angular alignment and orientation of associated optical elements such as mirrors, lenses, and prisms. For example, it may be necessary that the surfaces of associated mirrors located within a laser cavity be precisely perpendicular to the optical path. Devices for effecting this precise angular orientation of the optical elements should not be expensive to manufacture nor difficult to assemble or manipulate. These devices should also be mechanically stable so that the laser system is not exposed to external mechanical vibrations. Also, in light of the close-quarter work which may be involved, such devices should be compact. Finally, the capability for coarse and fine adjustment about at least one axis should also be provided.

It will be apparent to those skilled in the art that other types of systems, such as an antenna system, may depend upon the precise angular adjustment and orientation of associated elements.

It is therefore an object of the present invention to effect precise angular adjustment of a structure such as an optical element.

It is another object of this invention to effect precise angular adjustment of a structure such as an optical element about two orthogonal axes.

It is a further object of this invention to allow for coarse and fine angular adjustment of a structure such as an optical element about a predetermined axis of rotation.

It is a still further object of this invention to provide a device capable of the aforementioned functions and which is inexpensive to manufacture, easy to assemble and manipulate, is compact, and exhibits substantial mechanical stability.

SUMMARY OF THE INVENTION

According to the present invention, a mount for rotatably orienting a structure such as an optical element about a predetermined axis of rotation comprises a cross spring pivot and an associated coarse-fine adjustment mechanism. The cross spring pivot includes a first member, a second member which is rotatable relative to the first member and which has the optical element attached thereto, and first and second interleaved flat leaf springs which connect the first and second members. The springs intersect to form the letter X, the center of the X defining the predetermined axis of rotation. The coarse-fine adjustment mechanism includes an elongated lever arm having its first end free and its second end rigidly attached to the second member. Coarse angular adjustment of the second member relative to the first member is effected via a screw mechanism which pushes the free end of the arm, the arm acting substantially as a cantilever beam, while fine adjustment is effected via a spring-screw mechanism which pulls the center of the arm, the arm acting substantially as a simply supported beam. Improved mechanical stability results when the springs' intersection angle is 90° and when at least five interleaved spring portions are utilized. Further, lost motion during angular adjustment of the second member relative to the first is completely eliminated by giving either the first or second member an unsymmetrical cross section. Finally, the total working areas of the interleaved segments of the springs are made equal to each other.

According to one illustrative embodiment of the invention, an adjustable mount for independently orienting a structure such as an optical element about two orthogonal axes comprises first and second orthogonal cross spring pivots and respectively associated first and second coarse-fine adjustment mechanisms.

It is therefore an advantage of the present invention that it requires relatively few parts and is therefore easy to manufacture and assemble.

It is another advantage of this invention that frictional effects and the accompanying hysteresis are substantially eliminated since the cross spring pivot has no parts which slide relative to each other.

It is a further advantage of this invention that it requires relatively little space.

It is a still further advantage of this invention that the cross spring pivot is configured to provide substantially improved mechanical stability.

It is a still further advantage of this invention that the coarse-fine adjustment mechanism provides substantially improved sensitivity.

It is a still further advantage of this invention that the unsymmetrical cross spring pivot configuration allows for hysteresis-free fine adjustment about the desired nominal optical direction.

It is a feature of the present invention that one member of the cross spring pivot has an unsymmetrical cross section.

It is another feature of this invention that the intersection line of the interleaved springs defines the desired axis of rotation.

It is a further feature of this invention that coarse adjustment is effected by applying a pushing force to the free end of a lever arm whose other end is attached to the rotatable member, while fine adjustment is effected by applying a pulling force to the center of the arm.

It is a still further feature of this invention that at least five interleaved spring portions are utilized.

It is a still further feature of this invention that the two springs of the cross spring pivot provide equal working cross-sectional areas.

It is a still further feature of this invention that the two springs of the cross spring pivot intersect at a right angle.

It is a still further feature of this invention that two cross spring pivots are orthogonal to each other thereby allowing independent angular adjustment about two orthogonal axes.

DESCRIPTION OF THE DRAWING

The above and other objects, advantages, and features of this invention will be better appreciated by a consideration of the following detailed description and the drawing in which.

DETAILED DESCRIPTION

Figure 1:
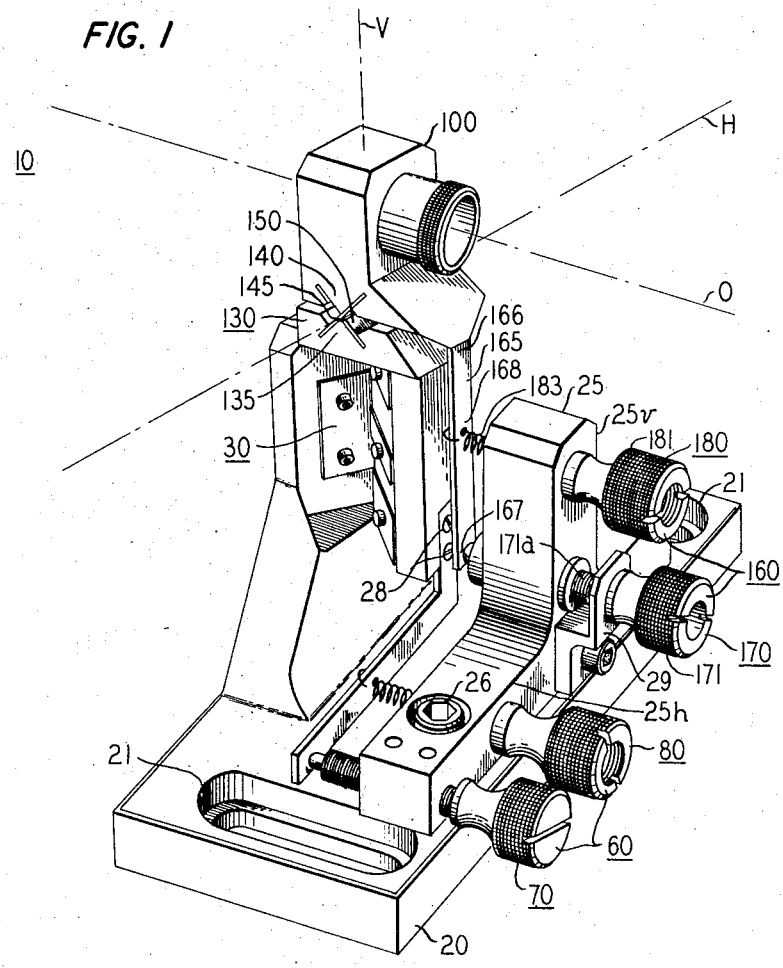
FIG. 1 is a perspective view of a two-axis adjustable mount according to the present invention.

FIG. 1 is a perspective view of two-axis adjustable mount 10 according to the present invention. A broad object of mount 10 is to allow precise angular adjustment of optical axis O relative to vertical axis V and horizontal axis H, as will be further explained hereinafter. Optical axis O can be associated with any optical element such as a mirror, a lens, or a prism which is housed in optical element holder 100. Mount 10 generally comprises base 20, cross spring pivots 30 and 130, and respectively associated coarse-fine adjustment mechanisms 60 and 160. The combination comprising cross spring pivot 30 and coarse-fine adjustment mechanism 60 allows for the precise angular orientation of holder 100 about vertical axis V, while the combination comprising cross spring pivot 130 and coarse-fine adjustment mechanism 160 allows for the precise angular orientation of holder 100 about horizontal axis H. Base 20 includes elongated holes 21 which are utilized to secure overall mount 10 via bolts to an associated table, not shown. Attached to base 20 via bolts 26 is inverted T-shaped structure 25 whose horizontal portion 25h includes parts of coarse-fine adjustment mechanism 60 and whose vertical portion 25v includes parts of coarse-fine adjustment mechanism 160. Other portions of adjustment mechanisms 60 and 160 are respectively attached to cross spring pivots 30 and 130, as will be further explained hereinafter. As a matter of information, a basic cross spring pivot is described in an article by W. E. Young entitled "Investigation of the Cross Spring Pivot," *ASME Journal of Applied Mechanics*, June, 1944.

While the mount according to this invention is being described herein in terms of its application to the precise angular adjustment of an optical element, it will be apparent to those skilled in the art that such a mount is equally applicable to the precise angular adjustment of other structures.

Figure 2A:
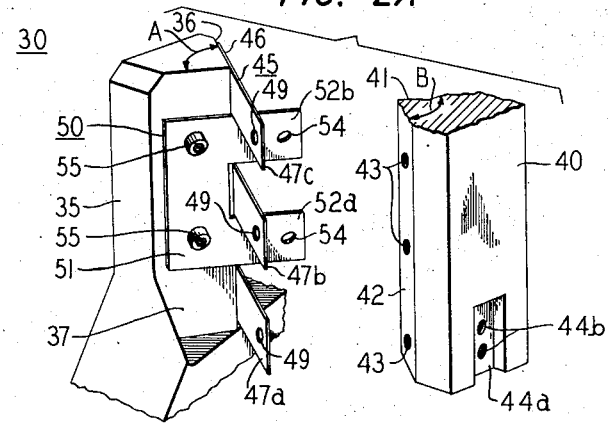
FIG. 2A is an exploded, partially fragmentary, perspective view of a cross spring pivot according to the present invention while FIGS. 2B and 2C respectively show the two pairs of leaf springs used in the cross spring pivots of FIG. 1.

FIG. 2A is an exploded, partially fragmentary, perspective view of cross spring pivot 30 according to the present invention. Cross spring pivot 30 generally comprises first member 35, second member 40 which in the completely assembled pivot is rotatable relative to first member 35, and first and second flat leaf springs 45 and 50. The leaf springs herein are advantageously made of spring-temper phosphor-bronze. First member 35, which in this case is an integral part of base 20, includes first and second vertical flat surfaces 36 and 37 which intersect at the angle A to form a first wedge structure. Similarly, second member 40 includes first and second vertical flat surfaces 41 and 42 which intersect at the angle B to form a second wedge structure. In this particular embodiment angles A and B are right angles, which results in substantially improved mount stability. It is apparent that these intersection angles should be less than 180°. Slot 44a and threaded holes 44b on member 40 are provided for attaching one end of lever arm 65 to member 40, as will be further explained hereinafter.

Figure 2B:
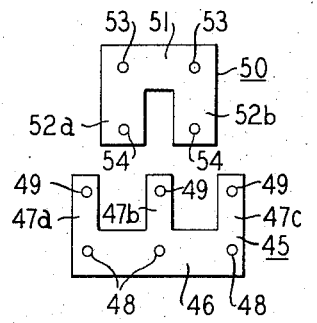

FIG. 2B shows in detail leaf springs 45 and 50 of cross spring pivot 30. First leaf spring 45 includes main body portion 46 and a plurality of outwardly extending portions 47a, b, c. Mounting holes 48 are provided for attaching main body portion 46 to surface 36 of member 35 while mounting holes 49 are provided for attaching outwardly extending portions 47a, b, c to surface 42 of member 40. It is apparent that appropriately located threaded holes in members 35 and 40, such as holes 43 on surface 42 of member 40, are provided for this purpose. In a similar manner, second leaf spring 50 includes main body portion 51 and outwardly extending portions 52a, b. Again, mounting holes 53 are provided for attaching main body portion 51 to surface 37 of member 35 while mounting holes 54 are provided for mounting outwardly extending portions 52a, b to surface 41 of member 40. Appropriately located threaded holes are also provided on members 35 and 40 for this purpose. See FIG. 2A. While the main body portions of leaf springs 45 and 50 are associated with member 35 herein, they could otherwise be associated with member 40, this being only a matter of choice. It should be noted that the total working cross-sectional area provided by outwardly extending portions 47a, b, c is equal to the total working cross-sectional area provided by outwardly extending portions 52a, b. It should also be noted that leaf spring 45 includes three extending portions while leaf spring 50 includes two extending portions, thereby yielding a total of five extending portions. It has been determined that utilizing a total of at least five interleaved extending portions provides substantially improved mount stability. In particular, the total number of outwardly extending portions should be any odd number greater than or equal to five, in which case one spring has one more extending portion than the other spring.

Returning now to FIG. 2A, it is apparent that main body portion 51 of leaf spring 50 is attached to surface 37 of member 35 using socket-head screws 55 which are screwed into the previously mentioned threaded holes on member 35. Main body portion 46, outwardly extending portions 47a, b, c, and outwardly extending portions 52a, b would similarly be attached to respectively associated surfaces 36, 42 and 41. When the elements shown in FIG. 2A are assembled, first and second leaf springs 45 and 50 intersect to form the letter X, the center line of this X defining vertical axis V. It is about this center line that rotation of member 40 relative to member 35 occurs, as will be further explained with respect to FIG. 3.

According to this invention, member 35 has an unsymmetrical cross section; in other words, while angles A and B are both equal to 90°, a cross-sectional view of member 35 does not yield a symmetrical configuration as does a cross-sectional view of member 40. This is clearly illustrated in FIG. 3. Therefore, when cross spring pivot 30 is initially assembled, the bisector of angle A is not parallel, and in particular, not colinear, with the bisector of angle B. According to this particular embodiment, these two bisectors are not aligned until member 40 is appropriately rotated approximately 4° relative to member 35. This is effected using coarse adjustment means 70 as will be explained with reference to FIG. 3. Thereafter, hysteresis-free angular orientation of optical element holder 100 about vertical axis V using fine adjustment means 80 can be effected. In other words, having an initial offset angle of 4° and thereafter aligning the bisectors of angles A and B, coarse and fine adjustment about vertical axis V can be then effected within the range of +2.5° and −3.5° without loss of tracking. Therefore, cross spring pivot 30 is biased by initially assembling members 35 and 40 several degrees off the desired optical direction thereby achieving a restoring or biasing force. This bias therefore allows for adjustment on both sides of vertical axis V. While the unsymmetrical cross section is exhibited by member 35 herein, it could otherwise be exhibited by member 40, this being only a matter of choice.

Figure 2C:
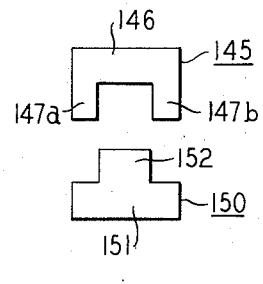

As shown in FIG. 1, cross spring pivot 130 includes first member 135, second member 140 which is rotatable relative to member 135 about horizontal axis H and which has optical element holder 100 attached thereto, and first and second interleaved flat leaf springs 145 and 150 which connect members 135 and 140. Springs 145 and 150 intersect to form the letter X, the center line of the X defining horizontal axis H. As shown in FIG. 2C, first leaf spring 145 includes main body portion 146 and outwardly extending portions 147a, b. Further, second leaf spring 150 includes main body portion 151 and outwardly extending portion 152. Again, the total working cross-sectional area provided by extending portions 147a, b is equal to the total working cross-sectional area provided by extending portion 152. In this case, a total of only three interleaved outwardly extending portions are utilized, this being determined by manufacturing and limited space requirements. However, as was mentioned before, utilizing a total of at least five interleaved outwardly extending spring portions, as in cross spring pivot 30, provides substantially improved mechanical stability.

In cross spring pivot 130, main body portions 146 and 151 are press fitted into slots or grooves which are machined into member 135 while outwardly extending portions 147a, b and 152 are press fitted into slots or grooves which are machined into member 140. The slots or grooves machined into member 135 provide flat surfaces which intersect at 90° to form a first wedge structure while the slots or grooves machined into member 140 also intersect at 90° to form a second wedge structure. Further, cross spring pivot 130 is constructed in such a manner that one of its members, in this case member 135, has an unsymmetrical cross-sectional configuration. In other words, the wedge angles of members 135 and 140 are both equal, yet, when cross spring pivot 130 is initially assembled, the bisector of the wedge angle of member 135 is not parallel and, in particular, is not colinear with the bisector of the wedge angle of member 140. Again, member 140 must initially be rotated relative to member 135 approximately 4° in order to align the two bisectors. Thereafter, hysteresis-free angular adjustment of member 140 relative to member 135 about horizontal axis H can be effected, as will be further explained hereinafter. While the main body portions of leaf springs 145 and 150 are associated with member 135 herein, they could otherwise be associated with member 140, this being only a matter of choice.

Figure 3:
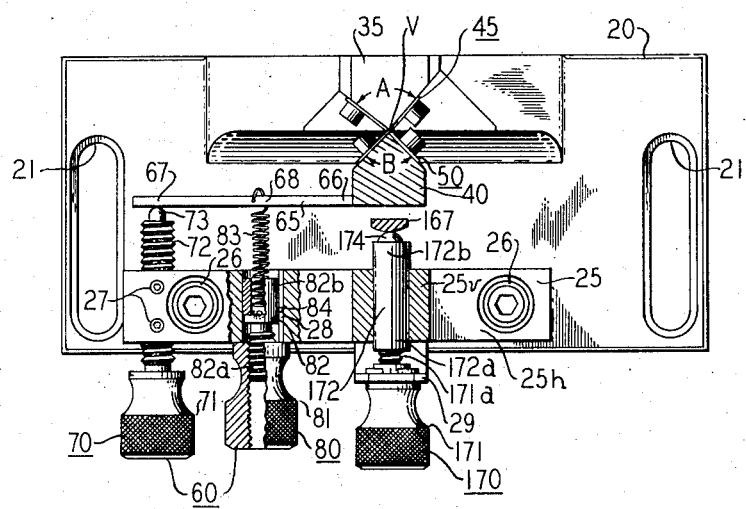
FIG. 3 is a top, partially fragmentary, crosssectional view of the mount of FIG. 1 specifically illustrating a coarse-fine adjustment mechanism according to the present invention.

FIG. 3 is a top, partially fragmentary, cross-sectional view of mount 10 specifically illustrating coarse-fine adjustment mechanism 60 according to the present invention. It will be recalled that member 40 of cross spring pivot 30 rotates relative to member 35 about vertical axis V which is defined by the intersection of interleaved leaf springs 45 and 50. It is therefore an object of coarse-fine adjustment mechanism 60 to effect controlled positioning of member 40 relative to member 35. Adjustment mechanism 60 includes coarse adjustment means 70, fine adjustment means 80, and lever arm 65. End 66 of lever arm 65 is inserted into slot 44a and rigidly attached to member 40 via screws 28, as shown in FIG. 1, while end 67 of the arm is free. Associated with end 67 of lever arm 65 is coarse adjustment means 70 which further includes knurled knob 71, externally threaded portion 72, and hemispherical end 73. Externally threaded portion 72 is in mating relationship with an internally threaded hole, not shown, located on horizontal portion 25h of inverted T-structure 25. As will be apparent to those skilled in the art, clockwise rotation of knob 71 causes upward motion of hemispherical end 73, which, in turn, pushes free end 67 of lever arm 65. In other words, clockwise rotation of knob 71 causes clockwise rotation of end 66 of arm 65 which, in turn, causes clockwise rotation of member 40 relative to vertical axis V. It is apparent that the direction of this pushing force always intersects the longitudinal axis of arm 65. Socket-head screws 27 are utilized to adjustably secure threaded member 72 relative to horizontal portion 25h of structure 25. It should be noted that coarse adjustment of cross spring pivot 30 is effected by loading lever arm 65 substantially as a cantilever beam, against the preset bias of the pivot.

Now, associated with center portion 68 of arm 65 is fine adjustment means 80 which further includes internally threaded knurled knob 81, member 82 further including externally threaded portion 82a on one end thereof and hollow cylindrical portion 82b at the other end thereof, and spring 83. Knob 81 and portion 82a are in threadable engagement as shown. One end of spring 83 is attached to cylindrical portion 82b while the other end of the spring is attached to center portion 68 of arm 65. Transversely attached to cylindrical portion 82b is pin 84 which guides portion 82b along a straight groove or slot 28 located on horizontal portion 25h. Therefore, the motion of member 82 is constrained along its longitudinal direction, no rotation thereof being allowed. As will be apparent to those skilled in the art, clockwise rotation of knob 81 causes downward motion of member 82, which, in turn, causes stretching of spring 83. Spring 83 then applies a downward pulling force to center portion 68 of arm 65. In other words, clockwise rotation of knob 81 causes counterclockwise rotation of end 66 of arm 65 which, in turn, causes counterclockwise rotation of member 40 relative to vertical axis V. Therefore, fine adjustment of cross spring pivot 30 is effected by loading lever arm 65 substantially as a simply supported beam.

It should be noted that arm 65 is a stiff spring when compared to spring 83 and to the rotational torque set up by the preset bias of cross spring pivot 30.

With reference now to FIGS. 1 and 3, coarse-fine adjustment mechanism 160, which is associated with cross spring pivot 130, comprises coarse adjustment means 170, fine adjustment means 180, and lever arm 165. End 166 of lever arm 165 is rigidly attached to member 140 of cross spring pivot 130 while end 167 of the arm is free. Associated with center portion 168 of arm 165 is fine adjustment means 180 which further includes internally threaded knurled knob 181, spring 183, and other components similar to those of fine adjustment means 80. Again, clockwise rotation of knob 181 causes stretching of spring 183 which results in the application of a pulling force to center 168 of arm 165, arm 165 being loaded substantially as a simply supported beam against the preset bias of the pivot.

It will be recalled that optical element holder 100 and lever arm 165 are both attached to member 140 of cross spring pivot 130. Further, member 140 rotates relative to member 135 about horizontal axis H which is defined by the intersection of interleaved springs 145 and 150. In turn, member 135 of cross spring pivot 130 is attached to member 40 of cross spring pivot 30. Finally, member 40 rotates relative to member 35 about vertical axis V which is defined by the intersection of interleaved springs 45 and 50. It is therefore apparent that the longitudinal axis of lever arm 165 exhibits a circular motion about vertical axis V whenever member 40 rotates about vertical axis V. Therefore, in order to compensate for this motion of lever arm 165, coarse adjustment means 170 is designed as follows. Coarse adjustment means 170 includes knurled knob 171 having externally threaded portion 171a, cylinder 172 having internally threaded end 172a, and ball bearing 174 which is imbedded into end 172b of cylinder 172. Portion 171a and end 172a are threaded to each other as shown. Knob 171 is rotatably attached to vertical portion 25v of structure 25 via member 29 and mechanical fastening means. In this particular embodiment, free end 167 of arm 165 is given a circular, or curved, cross-sectional configuration, the center of the curve being located at vertical axis V. This is shown in FIG. 3. As will be apparent to those skilled in the art, counterclockwise rotation of knob 171 results in the application of a pushing force to free end 167 to lever arm 165, arm 165 being loaded substantially as a cantilever beam. It should be noted that ball bearing 174 rides on the circular surface of lever arm 165, in a direction perpendicular to the longitudinal axis of the arm, whenever member 40 of cross spring 30 is rotated relative to member 35 thereof. It is therefore apparent that the direction of the pushing force applied by bearing 174 to end 167 of arm 165 does not always intersect the longitudinal axis of the arm. Associated with cylinder 172 is a pin, not shown, which guides cylinder 172 along a straight slot or groove, also not shown, located on vertical portion 25v of structure 25. Therefore, the motion of cylinder 172 is constrained along its longitudinal direction, no rotation thereof being allowed. Again, screws, not shown, are utilized to adjustably secure cylinder 172 relative to vertical portion 25v of structure 25.

Again, arm 165 is a stiff spring when compared to spring 183 and to the rotational torque set up by the preset bias of cross spring pivot 130.

One recommended method for orienting optical element holder 100 is to first adjust coarse adjustment means 170, secondly to adjust coarse adjustment means 70, thirdly to adjust fine adjustment means 160, and finally to adjust fine adjustment means 80. The fine adjustment mechanism according to this invention can easily be configured to exhibit the equivalent of 2000 threads per inch motion.

While the arrangement according to this invention for effecting precise angular adjustment of a structure such as an optical element about a predetermined axis has been described in terms of a specific embodiment, it will be apparent to those skilled in the art that many modifications are possible within the spirit and scope of the disclosed principle.

What is claimed is:

1. A mount for rotatably orienting a structure about first and second predetermined axes, said mount comprising:

a first member including first and second flat surfaces intersecting at a first predetermined angle of substantially 90°;

a second member including third and fourth flat surfaces also intersecting at said first predetermined angle;

first and second flat springs each including a body portion and a plurality of outwardly extending portions for connecting the first and second surfaces of said first member to the third and fourth surfaces of said second member, said springs being interleaved to form the letter X, the center of said X defining said first predetermined axis, and the total cross-sectional areas of the outwardly extending portions on said first and second springs being equal;

a third member including fifth and sixth flat surfaces intersecting at a second predtermined angle of substantially 90°;

a fourth member including seventh and eighth flat surfaces also intersecting at said second predetermined angle, said structure being attached to said fourth member;

third and fourth flat springs each including a body portion and a plurality of outwardly extending portions for connecting the fifth and sixth surfaces of said third member to the seventh and eighth surfaces of said fourth member, said third and fourth springs being interleaved to form the letter X, the center of said X defining said second predetermined axis, the total cross-sectional areas of the outwardly extending portions on said third and fourth springs being equal, and said third member being attached to said second member such that said second predtermined axis is perpendicular to said first predetermined axis, application of a torque to said second member causing simultaneous rotation of said second, third, and fourth members about said first predetermined axis and application of a torque to said fourth member causing rotation thereof about said second predetermined axis, a first lever arm having one end attached to said second member, the longitudinal axis of said first arm being perpendicular to said first predetermined axis, first coarse adjustment means for loading said first arm at its second end along a first direction substantially as a cantilever beam, and first fine adjustment means for loading said first arm at its center along the direction opposite to said first direction substantially as a simply supported beam;

a second lever arm having one end attached to said fourth member, the longitudinal axis of said second arm being perpendicular to said second predetermined axis, second coarse adjustment means for loading said second arm at its second end along a second direction substantially as a cantilever beam, and second fine adjustment means for loading said second arm at its center along the direction opposite to said second direction substantially as a simply supported beam.

2. Apparatus in accordance with claim 1, further including means including rotation of said second member about said first axis beyond its initially assembled position for effecting linear alignment of the bisectors of said first and second angles.

* * * * *